United States Patent
Pollak et al.

[15] 3,670,788
[45] June 20, 1972

[54] ARBOR SAW

[72] Inventors: Henry M. Pollak; Robert S. Pollak, both of c/o American Machine & Tool Co., Inc. of Pa., Royersford, Pa. 19468

[22] Filed: May 22, 1970

[21] Appl. No.: 39,819

[52] U.S. Cl. ................................143/36 R, 143/35 R
[51] Int. Cl. .................................................B27b 5/24
[58] Field of Search ............143/35 R, 36 R, 36 A, 36 B, 143/36 C, 36 D, 36 E, 36 F, 36 G, 33

[56] References Cited

UNITED STATES PATENTS

| | | |
|---|---|---|
| 2,973,789 | 3/1961 | Palmer.......................143/36 |
| 1,988,102 | 1/1935 | Woodward..................143/36 |
| 2,758,615 | 8/1956 | Mastriforte...............143/36 B |

*Primary Examiner*—Donald R. Schran
*Attorney*—Seidel, Gonda & Goldhammer

[57] ABSTRACT

An arbor saw that can be moved vertically with respect to the table on which it is mounted and also displaced about a horizontal axis so as to cut a bevel. An integrated linkage is provided for achieving these two functions so that the blade can be displaced vertically without effecting its angle of bevel, but when the blade is displaced about a horizontal axis it is automatically lowered.

9 Claims, 8 Drawing Figures

INVENTORS
HENRY M. POLLAK
ROBERT S. POLLAK
BY
Seidel, Gonda & Goldhammer
ATTORNEYS

INVENTORS
HENRY M. POLLAK
ROBERT S. POLLAK

BY Seidel, Gonda & Goldhammer
ATTORNEYS

INVENTORS
HENRY M. POLLAK
ROBERT S. POLLAK

BY
Seidel, Gonda, & Goldhammer
ATTORNEYS

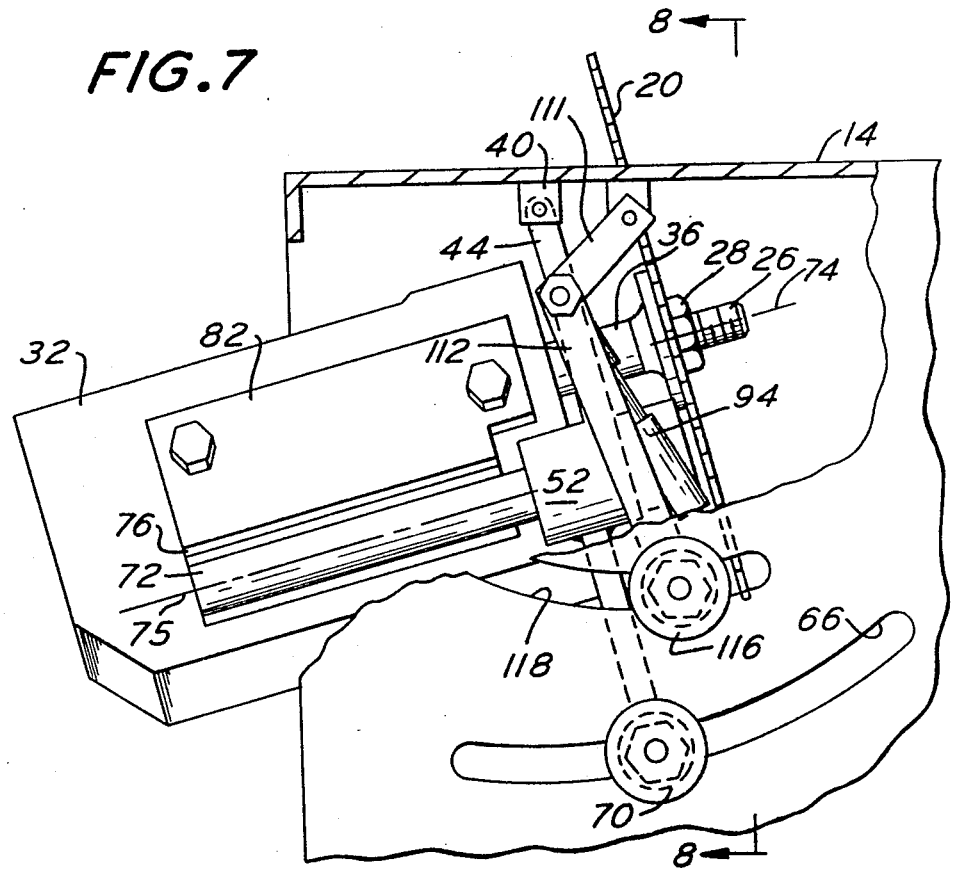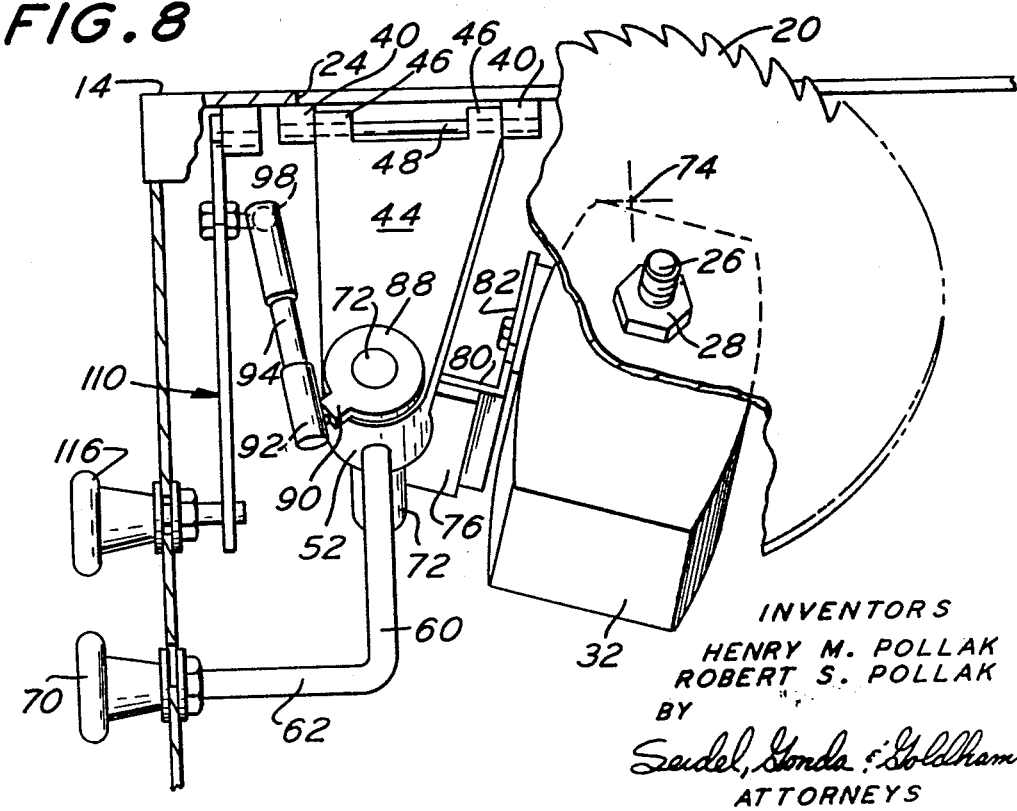

ARBOR SAW

This invention relates to an arbor saw and more particularly to the blade supporting mechanism of an arbor saw which can be tilted about two separate axes.

Arbor saws are well known as table saws wherein a motor for driving a circular saw blade is supported below the table and the saw blade extends upwardly through a slot therein. These saws have wide applications both in commercial enterprises and also in home workshops. They are widely used because of the high degree of cutting accuracy achieved thereby.

Additionally, by virtue of the mechanism supporting the motor and the saw blade it is possible to cut at angles other than the vertical and additionally, by raising and lowering the blade, it is possible to vary the depth of cut.

While ordinarily a conventional saw blade that is relatively thin is used it is desirable on occasion to provide a plurality of blades which are spaced along the arbor as an alternative to utilize one relatively thick blade as for shaping or the like. Thus, many arbor saws are provided with a rather large arbor extending outwardly from the drive motor or transmission to support the saw blade.

When the conventional saw blade is utilized a large portion of the arbor extends outwardly therefrom. This arbor, although it is not being utilized, still cannot be disconnected. Ordinarily no problems are encountered in adjusting the saw blade because of this arbor. However, when the saw blade is set so that it is near its maximum cutting position and the arbor closely underlies the table, and, then the saw blade is tilted, invariably, the free end of the arbor bangs against the underside of the table. It is apparent that this banging may cause substantial damage to the drive mechanism for the saw blade or may, if repeated, substantially damage the arbor or the table.

This problem is well known and presents a substantial amount of inconvenience in operating arbor saws.

In the past, when it became necessary to cut a bevel, the operator would first lower the saw blade to where it would make a relatively shallow cut and then proceed to tilt it. If he was successful then the arbor would clear the bottom surface of the table. If he were unsuccessful the arbor would again bang into the bottom of the table. Thus, it would be necessary to lower the saw blade further.

Another way of avoiding this interference during tilting of the blade is to provide a limit on the upward movement of the saw blade so that when it is tilted the arbor cannot strike the table top.

It is apparent that substantial inconvenience, unreliability and lost time is achieved in implementing the alternatives noted above in preventing the problem of striking the arbor on the underside of the table.

Accordingly, it is an object of this invention to provide a new and unobvious arbor saw.

It is another object of this invention to provide an arbor saw having a linkage which permits the saw blade to be adjusted vertically with respect to the saw table.

It is still another object of this invention to provide an arbor saw which has a linkage that permits the saw blade to be displaced from the vertical.

It is still another object of this invention to provide an arbor saw that has a linkage which permits the saw blade to be automatically lowered when it is displaced from the vertical.

Generally the invention relates to a linkage for permitting an arbor saw to be moved relative to the table upon which it is supported comprising a supporting frame, a bracket connected to the supporting frame for rotation about a first axis, a second axis of rotation defined by said bracket, said second axis being movable with said bracket for rotation about said first axis cutting means coupled to said bracket for rotation about said second axis, moving means are provided for moving said cutting means about said axes, and means interrelate said moving means and said cutting means so that when said bracket is moved about said first axis said cutting means moves about said second axis.

Other objects and advantages of the subject invention will be apparent from a detailed description thereof which follows, wherein:

FIG. 7 is a view of the arbor saw shown in FIG. 1, however, showing the blade displaced from the vertical.

FIG. 8 is a sectional view taken along line 8—8 of FIG. 7.

Figure 1:
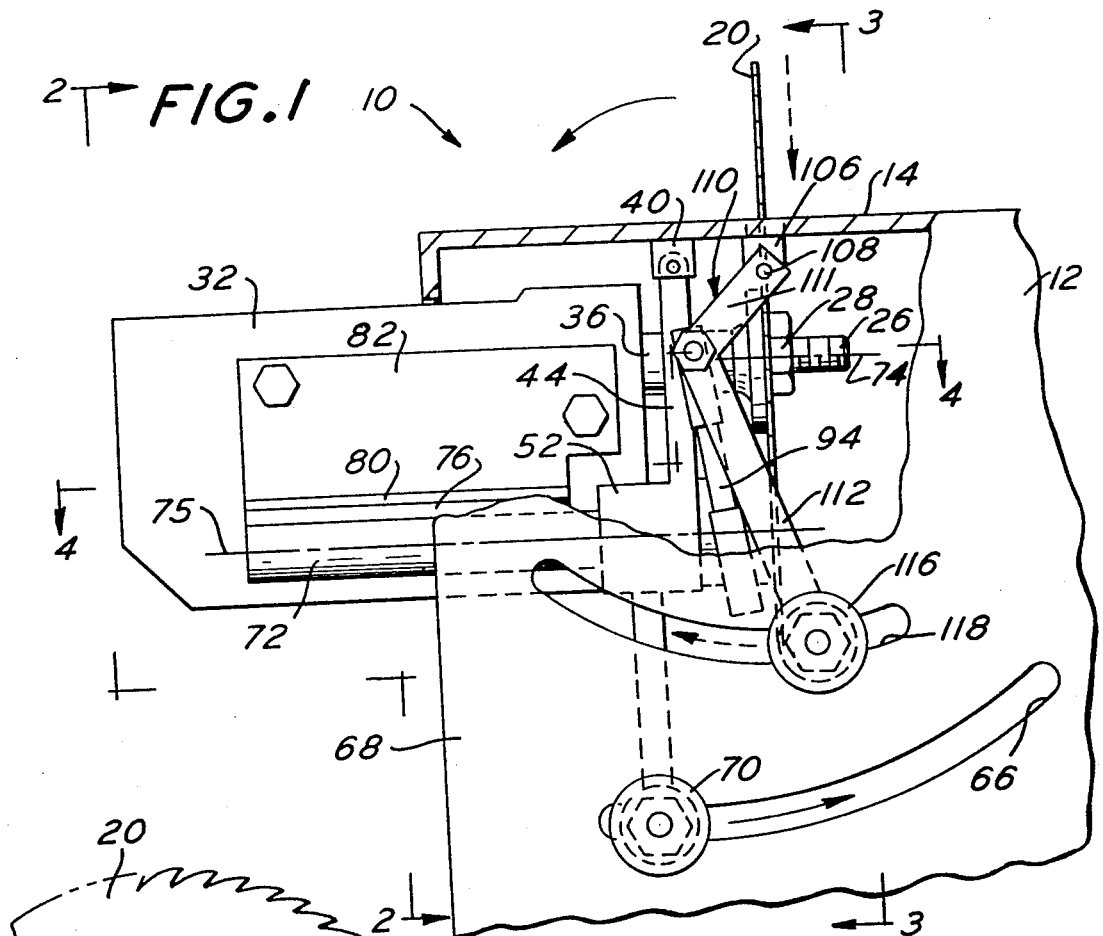
FIG. 1 is a side sectional view of an arbor saw with the blade disposed vertically in its full maximum position.

Referring now to the drawings, an arbor saw 10, is seen to comprise essentially a supporting frame 12 and a table 14. A saw blade 20 which may be a circular member having a plurality of regularly spaced teeth around its circumference extends upwardly through a suitable slot 24 in the table top. As will be explained more fully herein the slot 24 in the table top is substantially longer than the diameter of saw blade 20.

Figure 2:
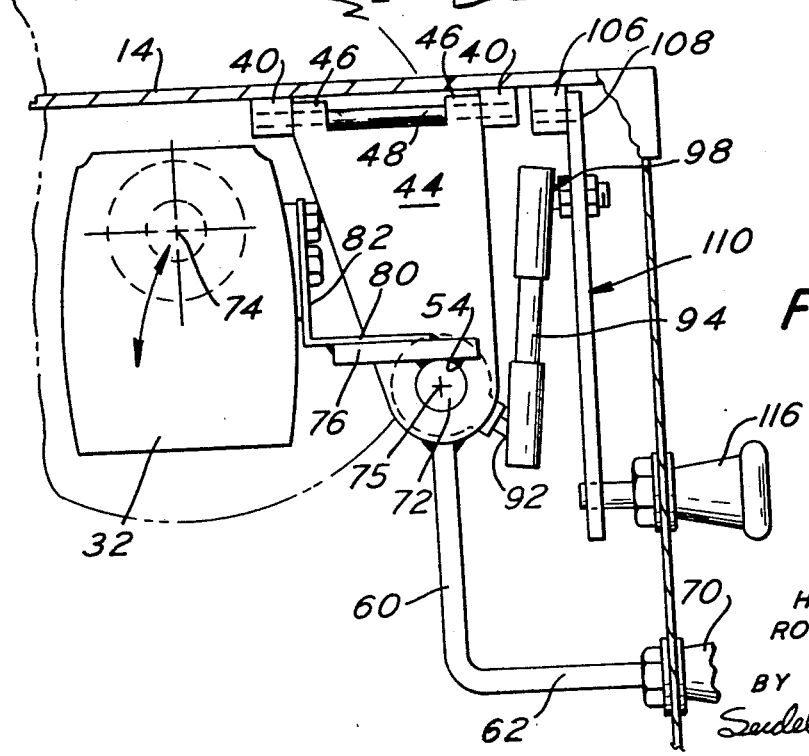
FIG. 2 is an end view taken along line 2—2 of FIG. 1.

Referring to FIGS. 1 and 2, the saw blade 20 is supported on a threaded arbor 26 by a suitable nut 28. The arbor may be connected to a transmission or as illustrated herein by way of example and not by way of limitation, be connected directly to a motor 32. The motor may be connected to a suitable source of electrical energy as is well known. A spacing member such as sleeve 36 may be provided for keeping the saw blade 20 a predetermined distance away from motor 32. Thus, the saw blade is held tightly between sleeve 36 and nut 28.

As best seen in FIG. 2, two spaced ears 40 which are positioned on the underside of table 14 rotatably support a yoke 44. The yoke has corresponding ears 46 which are spaced so as to lie alongside aforementioned ears 40 and be constrained for rotation thereabout by a suitable pin 48. The yoke, as illustrated in FIG. 2, may be a generally triangular shaped member having a raised sleeve 52 at its lower most portion. The sleeve defines a centrally located and substantially smooth cylindrical aperture 54 therein.

Means may be provided for rotating the sleeve about the axis defined by pin 48. Such a means may preferably take the form of bevel control arm 60 which has one portion thereof fixed to sleeve 52 and a second portion 62 which extends through an arcuate slot 66 in the side plate 68 of the table 14. If preferred arm 60 may be formed integrally with yoke 44.

A suitable knob 70 may be provided for locking the bevel control arm 60 in various positions along arcuate slot 66 so that the angle that the yoke 44 makes with respect to the vertical can be varied.

An elongated cylindrical shaft 72 is rotatably received within the aforementioned cylindrical aperture 54. As best seen in FIG. 2, motor 32 is fixed to the cylindrical shaft for rotation therewith. While this connection can be achieved by any suitable means it is to be preferred that the centerline 74 of the saw blade 20 be spaced from the longitudinal axis of rotation 75 of the cylindrical shaft. A preferred form of connection is illustrated in FIG. 2 wherein a plate 76 is welded or otherwise suitably fastened to the shaft 72 for rotation therewith. An elongated angle bracket has one leg 80 fastened to plate 76 and has its other leg 82 bolted to the side of motor 32. It is apparent that rotation of shaft 72 will cause the centerline 74 to rotate in an arc, thus lowering the saw blade 20 with respect to table top 14.

Cylindrical shaft 72 extends through the aperture 54 so that a portion of it is on the side of sleeve 52 that is remote from the motor. A collar 88 is fixed to this portion of the cylindrical shaft and may be constrained against rotation relative to that shaft by a set screw. In the alternative relative rotation can be constrained by the use of a splined connection or any other suitable connection.

Figure 3:
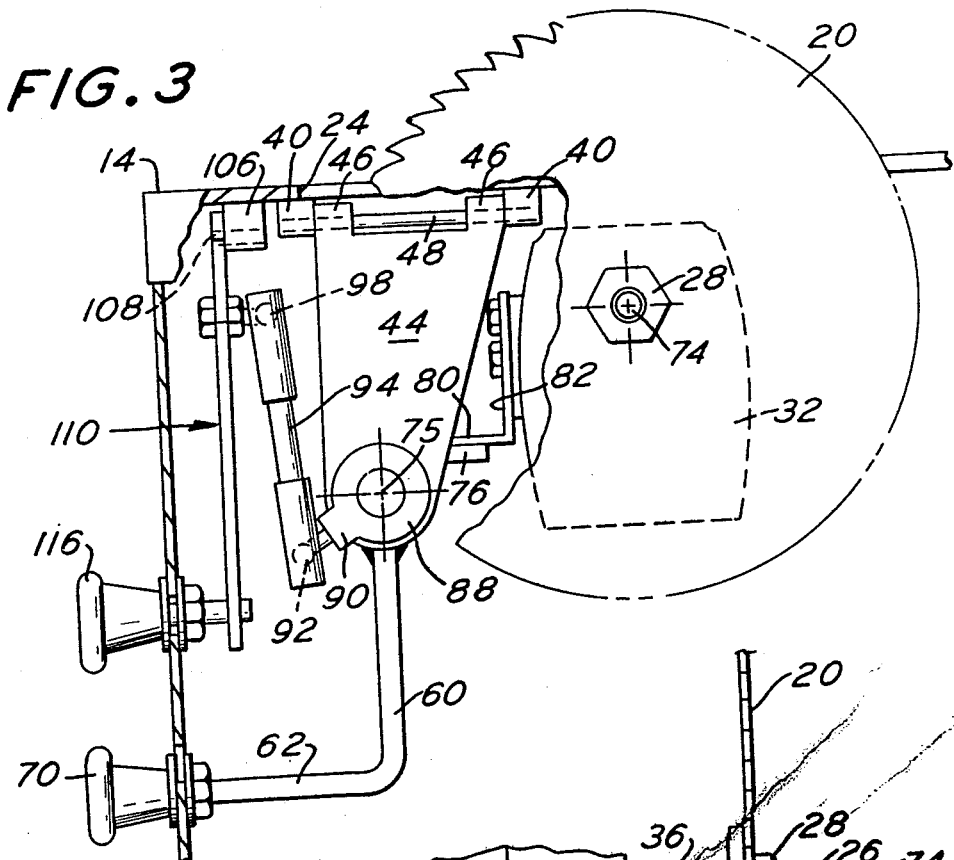
FIG. 3 is a partial sectional view taken along line 3—3 of FIG. 1.
Figure 4:
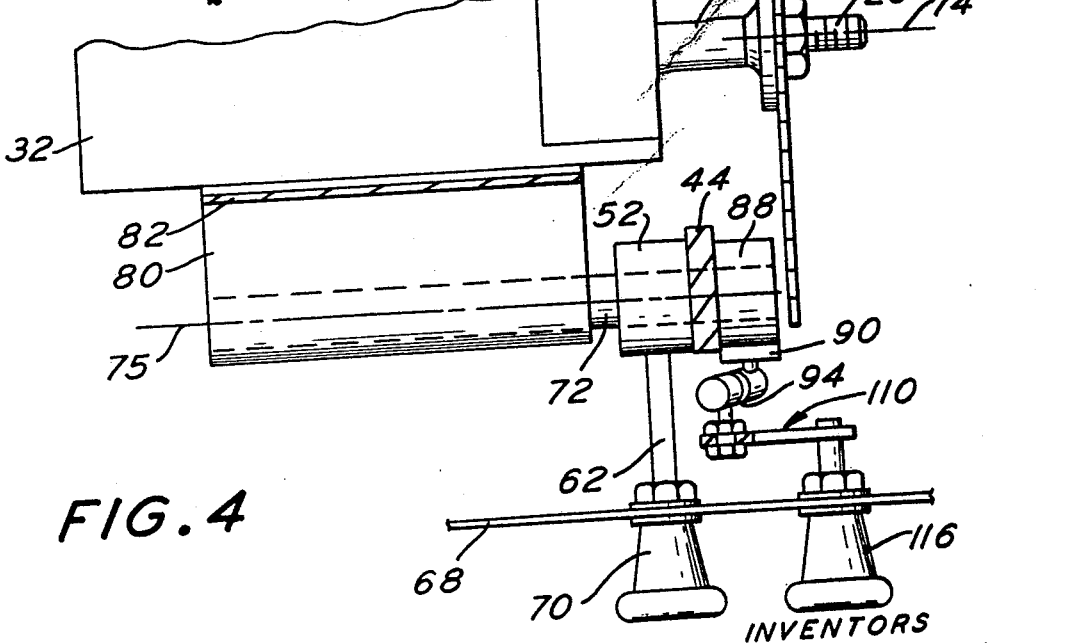
FIG. 4 is a sectional view taken along line 4—4 of FIG. 1.

As best seen in FIGS. 2 and 3 the collar 88 has a radially directed ear 90 which is connected to the ball joint 92 at one end of a rigid link 94.

The other end of rigid link 94 includes a second ball joint 98 which is in turn fastened to a suitable elevation control handle 102.

The elevation control handle 102 is supported on the underside of table 14 by a suitable ear 106. The ear supports a pin 108 which in turn rotatably carries the elevation control handle. The elevation control handle, as best seen in FIG. 1, is generally shaped like a dog-leg in that the upper portion thereof 111 is set at an angle with respect to the lower portion 112. The juncture of the upper and lower portions is the connection point for the ball joint 98 of rigid link 94 (FIG. 3). At the end of lower portion 112 the elevation control handle may be provided with a suitable knob 116 which is movable in an arcuate slot 118 which is close to and overlies aforementioned arcuate slot 66.

The knob 116 can be adjustable so that the position of the elevation control arm 110 along the slot 118 can be fixed.

It is to be noted that ear 106 is spaced from ears 40 so that the arcuate path followed by knob 116 is different but overlaps that followed by knob 70. Additionally, it is to be noted, that ball joint 98 moves along an arc whose center is defined by pin 108. Thus, as shown in FIG. 1 by virtue of the dog-leg ball joint 98 is positioned on the arc so that travel along it in a clockwise direction, as would be achieved by moving knob 116 in direction indicated by the arrow, results in vertical displacement of ball joint 98.

The afore described mechanism can be utilized for raising and lowering saw blade 20 when it is in the vertical plane. In FIGS. 1-4 the saw blade is shown extended to its maximum height above the table. As shown in FIGS. 2 and 3 the motor very closely underlies the table to permit this position.

Figure 6:
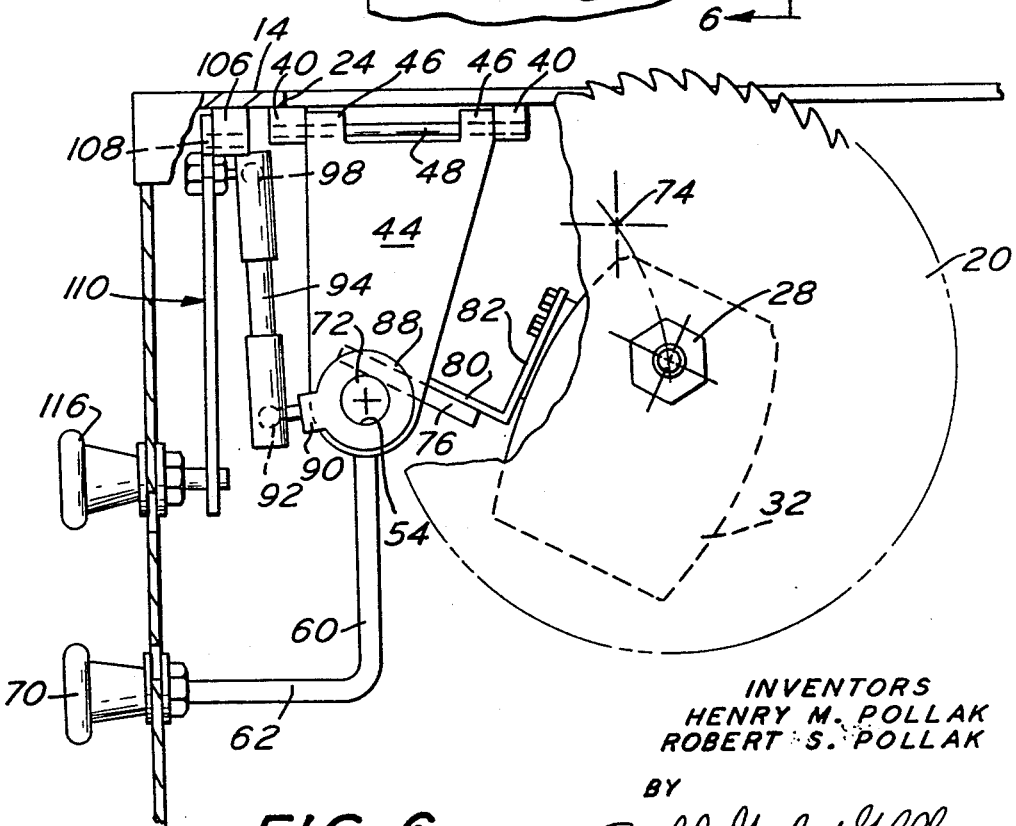
FIG. 6 is a sectional view taken along line 6—6 of FIG. 5.

In order to lower the blade to a position where less of it extends above the table top, knob 116 is moved along arcuate slot 118. As it does this, ball joint 98 by virtue of its being pinned to elevation control arm 112 also travels in an arc. As is apparent from an inspection of FIG. 1 the movement of the ball joint 98 is upwardly and to the left. This causes a corresponding upward movement of ball joint 92 at the opposite end of the rigid link 94. Since the ball joint is connected to collar 88, the ear 90 on that collar is caused to rotate clockwise as shown in FIG. 3 or counterclockwise as shown in FIG. 2. Since the shaft 72 is fixed to the collar for rotation therewith it also rotates in the same direction. But, as can be seen in FIG. 6, rotation of the motor in a clockwise direction causes the arbor to be displaced downwardly relative to the table top so that a reduced portion of the saw blade 20 is exposed. As shown in FIG. 6, the blade has moved to the right along slot 24. Accordingly, the purpose of the elongated slot 24 is to permit the blade to move longitudinally thereof as the motor is rotated about the longitudinal axis of cylindrical shaft 72.

Figure 5:
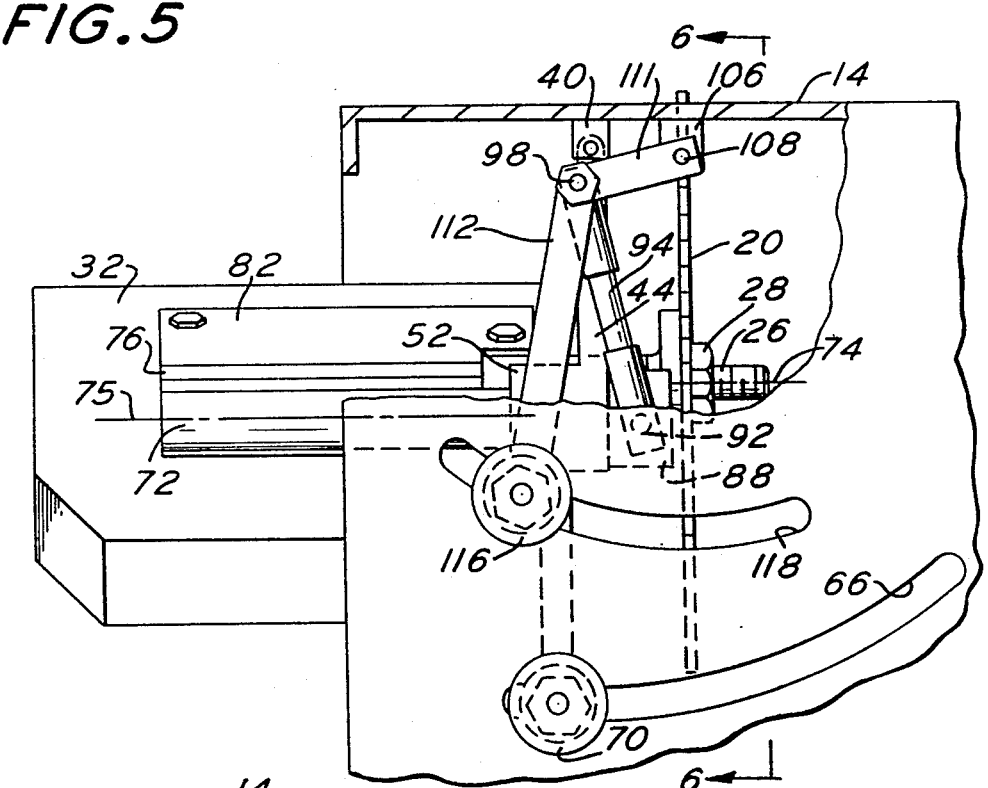
FIG. 5 is a view of the arbor saw shown in FIG. 1, however, showing the blade in a substantially lower position.

FIGS. 5 and 6 show the positions of the various elements when the saw blade has been positioned so that its circumference is just above the table top. Note that elevation control handle 102 and knob 116 have been moved to substantially the full left position of slot 118, and that ear 90 on collar 88 has been rotated from an angle approximating 45° in FIG. 3 to almost completely horizontal in FIG. 6. This has been achieved by virtue of the fact that link 94 and the ball joint connections at each of its ends have moved vertically in response to the swinging movement of arm 112.

The motor is held securely in the tilted position shown in FIG. 6 by virtue of the legs 80 and 82 and plate 76 which, as indicated above, are securely fastened to cylindrical shaft 72.

In order to maximize the height of the saw blade it is merely necessary to move knob 116 to the right along slot of 118 (FIG. 5). This will result in a generally downward movement of link 94 and a counterclockwise rotation of cylindrical shaft 72 (FIG. 6) and a returning to the horizontal of plate 76. When plate 76 is disposed in a horizontal position the blade will be at its maximum height (FIG. 3).

The blade may also be displaced from its vertical position in order to cut a bevel.

Referring now to FIGS. 1-4 and 7, it can be seen that in order to displace the blade from the vertical, knob 70 is moved along slot 66 in the direction indicated by the arrow in FIG. 1. This causes bevel control arm 60 and yoke 44 to rotate about pin 48 and causes the cylindrical shaft 72, motor 32 and blade 20 to also rotate about that pin.

It is at this point that mechanisms known heretofore have failed. Since were it not for the relationship which is now to be described the end of arbor 26 would strike the underside of table 14 if the saw blade were near its highest position.

Striking of the underside of table 14 by arbor 26 is avoided, however, by virtue of the fact that as the sleeve 52 swings counterclockwise (FIG. 7) the distance between the center of the longitudinal axis cylindrical shaft 72 and ball joint 98 increases. An inspection of FIGS. 7 and 8 will reveal that this is so since cylindrical shaft 72 rotates about an arc defined by pin 48 which is spaced from ball joint 98.

However, because rigid link 94 is connected by ball joint 92 to collar 88, it causes that collar to rotate clockwise (FIG. 8). The clockwise rotation of collar 88 causes cylindrical shaft 72 to also rotate clockwise and, as indicated above, results in the motor and saw blade being pivoted in an arc about the longitudinal axis of cylindrical shaft 72 thereby lowering the arbor so that it does not strike the underside of the table.

The blade can be adjusted to any convenient height after it has been displaced from the vertical by merely moving knob 116 along slot 118 to increase or reduce the amount of rotation of collar 88 in order to raise or lower the blade to the desired height.

Similarly, by restoring the saw blade to a vertical position, the relation between rigid link 94 and collar 88 will cause the motor and saw blade to be returned to their previous position. Further, the depth of cut of the saw blade can be varied without regard to the angle at which it is disposed.

While the invention has been described with reference to a particular embodiment of an arbor saw and linkage for supporting the same, it is apparent that many other modifications and embodiments of the subject device will be apparent to those skilled in the art by virtue of the foregoing description. Thus the scope of the invention should not be limited by the foregoing detailed description, but rather only by the claims appended hereto.

We claim:

1. A linkage for simultaneously moving a cutting tool about two separate axes of rotation comprising a supporting frame, a bracket pivotally connected to said supporting frame for rotation about one of said axes of rotation, a second axis of rotation defined by said bracket, said second axis being movable with said bracket for rotation about said first axis, cutting means coupled to said bracket for rotation about said second axis, first and second moving means for moving said cutting means about each of said axes, and means coupling said first moving means and said cutting means so that when said bracket is pivoted to move said cutting means about said first axis said connecting means causes said cutting means to rotate about said second axis.

2. A linkage as defined in claim 1 wherein said bracket defines an aperture along said second axis, an elongated member rotatably supported in said aperture, said cutting means being fixed to said elongated member for rotation therewith about said second axis, said first moving means being coupled to said bracket, and said second moving means being coupled to said elongated member.

3. A linkage as defined in claim 2 wherein said elongated member includes a connection point that is radially spaced from said second axis, and said connecting means is a link interconnecting said connection point and said second moving means so that actuation of said second moving means causes said elongated member and said cutting means to rotate about said second axis.

4. A linkage as defined in claim 1 wherein said bracket is mounted for rotation about a horizontal axis, said bracket defining an aperture at its end remote from said axis, an elongated cylindrical shaft mounted in said aperture for rotation about its longitudinal axis, said longitudinal axis and said second axis being coincident, said cutting means including a circular saw blade, and the center of said saw blade being spaced from said second axis.

5. A linkage as defined in claim 4 wherein said cylindrical shaft has a connection point spaced from said longitudinal axis, said second moving means comprises a second control arm pivotally supported to said frame, a juncture on said second control arm adjacent said pivotal support, and said means connecting said first moving means and said cutting means is a link that extends between said connection point and said juncture.

6. A linkage as defined in claim 5 wherein said cylindrical shaft extends through said aperture, said shaft supporting said cutting means on one side of said bracket and a collar on the other side, said collar being fixed to said cylindrical shaft for rotation therewith, said juncture being located on said collar, and the portion of said second control arm that includes said pivotal support and said juncture is disposed at an angle spaced from the vertical so that pivotal movement of said second control arm causes said cylindrical shaft to rotate.

7. An arbor saw having a blade which can be raised and lowered comprising table means, an elongated member, means on said table means for supporting said elongated member for rotation about its axis, a motor and saw blade connected to said elongated member for rotation therewith, a collar fixed to the periphery of said elongated member, said collar defining a connection point radially spaced from said axis, a lever having one end pivotally connected to said table means and having its other end swingable in an arc defined by said pivotal connection, and a link interconnecting said connection point and said lever so that swinging of said lever causes rotation of said elongated member, said motor and said saw blade about said axis.

8. An arbor saw as defined in claim 7 wherein said means for supporting said elongated member is a bracket, said bracket being connected to said table and having an aperture therein, and said elongated member is rotatably supported in said aperture.

9. A linkage for lowering the saw blade of an arbor saw when the blade is displaced from the vertical comprising a supporting frame, a bracket pivotally connected to said supporting frame for rotation about a first axis of rotation, a second axis of rotation defined by said bracket, said second axis being movable with said bracket for rotation about said first axis, cutting means including said saw blade coupled to said bracket for rotation about said second axis, means for rotating said bracket about said first axis to displace said saw blade from the vertical, and elongated connection means, said connection means having one end pivotally coupled to said frame and its other end pivotally coupled to said cutting means so that when said bracket is rotated about said first axis said connection means and said cutting means cooperate to rotate said cutting means about said second axis to lower said saw blade.

* * * * *